(12) United States Patent
Kamimura et al.

(10) Patent No.: US 6,176,617 B1
(45) Date of Patent: Jan. 23, 2001

(54) LINEAR MOTION GUIDE UNIT WITH LUBRICATING PLATE ASSEMBLY

(75) Inventors: Akihiko Kamimura; Shigemasa Itabashi, both of Kanagawa (JP)

(73) Assignee: Nippon Thompson Co., Ltd., Tokyo (JP)

( * ) Notice: Under 35 U.S.C. 154(b), the term of this patent shall be extended for 0 days.

(21) Appl. No.: 09/309,297

(22) Filed: May 11, 1999

(30) Foreign Application Priority Data

Jun. 5, 1998 (JP) .................................................. 10-158054

(51) Int. Cl.[7] ..................................................... F16C 29/06
(52) U.S. Cl. .................................................. 384/13; 384/45
(58) Field of Search .............................. 384/43, 44, 45, 384/13; 464/168

(56) References Cited

U.S. PATENT DOCUMENTS

| | | |
|---|---|---|
| 5,694,811 | 12/1997 | Tsukada . |
| 5,857,779 | 1/1999 | Tsukada et al. . |
| 5,967,667 | 10/1999 | Yatsu . |
| 6,019,513 | 2/2000 | Tsukada et al. . |

FOREIGN PATENT DOCUMENTS

| | | |
|---|---|---|
| 8-200362 | 8/1996 | (JP) . |
| 9-053637 | 2/1997 | (JP) . |
| 10-205534 | 8/1998 | (JP) . |

*Primary Examiner*—Lenard A. Footland
(74) *Attorney, Agent, or Firm*—Browdy And Neimark (57) ABSTRACT

A linear motion guide unit is disclosed wherein lubricant-containing members of sintered resinous components are fixed to core metals with either of mechanical means and adhesives whereby the lubricant-containing members may be kept in an accurate sliding contact with the raceway grooves on the track rail. Lubricating plate assemblies attached on end caps by bolts are each composed of the lubricant-containing member of sintered resinous component, core metal and dustproof cover. The lubricant-containing members are each fixed on the associated core metal with adhesives or with mechanical means such as claws, grasping fingers or the like, which are formed on the core metals. The core metals have rigidity sufficient to protect the lubricant-containing members from deformation, resulting in keeping the highly accurate sliding contact relation of the lubricant-containing members with the raceway grooves on the track rail.

11 Claims, 8 Drawing Sheets

LINEAR MOTION GUIDE UNIT WITH LUBRICATING PLATE ASSEMBLY

BACKGROUND OF THE INVENTION

1. Field of the Invention

The present invention relates to a linear motion guide unit in which a sliding element movable on a rail track in a linearly sliding manner is provided therein with lubricating plate assemblies.

2. Description of the Prior Art

The recently remarkable development in mechatronics technology increasingly requires linear motion guide units improved in precision, speed and miniature and the use of such apparatus extends into many technical fields. The linear motion guide units are extensively incorporated in reciprocating apparatus, which is in general employed in semiconductor manufacturing apparatus, inspection instruments, industrial robots and the like. The linear motion guide units recently become required to meet with needs of maintenance-free as well as high precision, high speed and miniature. To cope with the needs, the linear motion guide unit has required the self lubrication of long service life on its relatively movable sliding areas.

Figure 20:
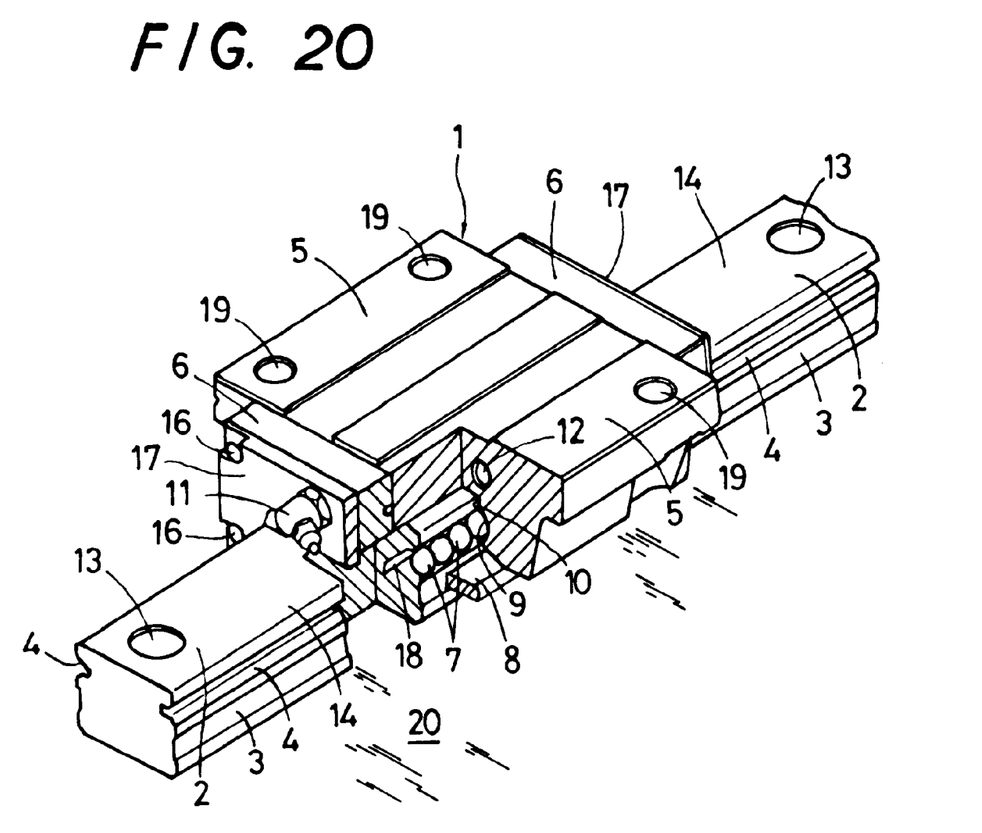
FIG. 20 is a partially cutaway view in perspective of a prior linear motion guide unit.

A conventional linear motion guide unit, as shown in FIG. 20, has a track rail 2 and a sliding element, or slider 1, saddling the track rail 2. The track rail 2 is formed on lengthwise side surfaces 3 thereof with raceway grooves 4 and the slider 1 may move on the track rail 2 by virtue of rolling elements 7 running through the raceway groove 4. The track rail 1 has on lengthwise upper surface 14 thereof openings 13 spaced from each other. The track rail 2 is fixed to a mounting base 20 such as beds, platforms, working tables or the like by screwing bolts through the openings 13 of the track rail 2 and matching openings in the mounting base 20. The slider 1 has a casing 5 movable with respect to the track rail 2, and end caps 6 attached to the opposing ends of the casing 5. Provided on the upper surface of the casing 5 are openings 19 for fixture, by which other appliances, parts, chucks, grasping jaws or the like are mounted on the slider 1. Both the casing 5 and end caps 6 are formed on the lower surfaces thereof with recesses 10 by which the casing 5 and end caps 6 may saddle track rail 2 for free movement. The recesses 10 are each formed with raceway grooves 9 in opposition to the raceway grooves 4 on the track rail 2. The rolling elements 7, are confined for free movement in loaded raceways defined between the confronting raceway grooves 4 and 9. Retainer bands 18 are provided in the casing 5 so as to embrace the rollingelements 7 to thereby prevent the rolling elements 7 from falling out of the casing 5. Bottom seals 8 are secured to the lower surfaces of the slider 1 for closing clearances between the track rail 2 and slider 1.

The end caps 6 are provided therein with turnarounds for circulating the rolling elements 7. Mounted on the end caps 6 are end seals 17 for ensuring the sealing performance between the track rail 2 and the lengthwise opposing ends of slider 1. The end caps 6 and end seals 17 are secured to the opposing ends of the casing 5 by means of screws 16. The raceways defined by the confronting raceway grooves 4, 9, turnarounds formed in the end caps 6 and return passages 12 formed in parallel with the raceway grooves 9 in the casing 5, in combination, constitute endless-circulating paths for the rolling elements 7. Even though the rolling elements 7 are under loaded condition in the raceways, rolling-contact of the rolling elements 7 with the raceway grooves 4, 9 may help ensure the smooth movement of the slider 1 relative of the track rail 2.

To lubricate the relative sliding ways in the linear motion guide unit constructed as described above, grease or lubricating oil is usually employed. In case of grease, it is applied to the relative sliding ways through grease nipples 11. In contrast, lubricating oil is supplied to the sliding ways through pipe joints, which are used substituting for the grease nipples.

Japanese Patent Laid-Open No. 53637/1997 discloses a linear motion guide unit having for its object to provide a maintenance-free lubrication system. In the linear motion guide unit cited above, a reinforcing plate, lubricant-containing member and side seals, overlaid one on another in the order mentioned just above, are attached over each outer end surface of the end caps. The reinforcing plate is of steel plate that is formed into a substantially inverted U-shape, which is fit to the outward contour of the end cap and makes no contact with the track rail. The lubricant-containing member is also formed into a substantially inverted U-shape, which is fit to the contour of the end cap. The lubricant-containing member is provided on the inside thereof with convex portions, which are formed in adaptation with the cross section of the track rail so as to make the sliding contact with the upper and side surfaces of the track rail. For constant supply of the lubricant to the track rail, the convex portions of the lubricant-containing member are forced against the raceway grooves on the track rail by means of, for example, ring members inserted in holes formed in the lubricant-containing member, or by making the lubricant-containing member itself from elastic material. Pressing the lubricant-containing members against the raceway grooves on the track rail, however, renders the frictional force greater, resulting in causing the high frictional resistance adverse to the smooth movement of the slider.

Disclosed in Japanese Patent Laid-Open No. 200362/1996 is a linear motion guide unit having a sliding element that has fixed by clamping on end surfaces thereof with sealing means in which a lubricant-containing polymer member of the mixture of olefinic polymer with lubricant is adhered integrally to a polyolefin resin layer on a reinforcing plate. The lubricant-containing member is manufactured by the steps of melting the mixture of olefinic polymer with poly (α-olefin) oil or the like, pouring the mixture into a mould and solidifying the molded mixture by cooling under pressure. In the prior art described above, it is very hard to bond together the lubricant-containing polymer member with the reinforcing plate of core metal, because much oil in the lubricant-containing polymer member is present on the confronting surfaces to be bonded together. Moreover, olefinic polymer for the lubricant-containing polymer member is inherently unsusceptible to bonding with other materials. The lubricant-containing polymer member of olefin polymer should be integrated with the reinforcing plate made of only the same olefinic resins susceptible to olefinic polymer, or integrally fused with an olefinic polymer coating over the metal plate.

Japanese Patent Laid-Open No. 205534/1998 discloses a linear motion guide unit that comprises a sliding element movable on a track rail formed with raceway grooves, the sliding element being composed of a casing formed with raceway grooves, rolling elements running through between the confronting raceway grooves, end caps arranged on end surfaces of the casing, lubricating plates arranged on the end caps, and end seals secured on the lubricating plates. The lubricating plates are each composed of a sintered resinous member having porous structure immersed with lubricating oil. The lubricating plates are urged against the raceway grooves on the track rail by elastic actions of metallic frames covering around the peripheries of the lubricating plates.

If the lubricant in the lubricant-containing member might be applied to the raceway grooves on the track rail in the linear motion guide unit with no urging the lubricating plates against the raceway grooves by the action of the external force, the sliding resistance between the lubricant-containing members and the raceway grooves on the track rail may be reduced remarkably while the lubricant-containing members may be kept from wear owing to the sliding contact of the lubricant-containing members relatively of the track rail. However, even if the lubricant-containing members are free from such urging force towards the track rail, the lubricant-containing members of porous structure are insufficient in resistance against deformation. It is, therefore, desired to use a core plate high in stiffness to thereby prevent the lubricant-containing member from the deformation while supply the lubricant to the raceway grooves with sure reliability.

SUMMARY OF THE INVENTION

The present invention has for its primary object to overcome the problems in the prior art as described above, and to provide a linear motion guide unit in which the lubricant-containing members to lubricate the raceway grooves are kept in substantial contact with the raceway grooves while kept from mechanical deformation, notwithstanding that no lubricant-containing member is urged against the raceway groove by the action of the external force such as elastic biasing force or the like, whereby the sliding element may move smoothly and the lubricant-containing members are kept against wear due to the movement of the sliding element relatively of the track rail and also prevented from clogging up.

The present invention relates to a linear motion guide unit comprising a track rail provided at lengthwise side surfaces thereof with first raceway grooves, a sliding element movable on the track rail, wherein the sliding element has a casing provided with second raceway grooves in opposition to the first raceway grooves, rolling elements movable along raceways defined between the confronting first and second raceway grooves, end caps secured to the opposing end surfaces of the casing, lubricating plate assemblies secured on the end caps, and end seals arranged on the ends of the lubricating plate assemblies, and further wherein the lubricating plate assemblies each have a core metal and a lubricant-containing member fixed on the core metal with adhesives or mechanical means, the lubricant-containing member being made of a sintered resinous component having porous structure immersed with lubricant.

According to one aspect of the present invention, the core metals have rigidity sufficient to protect the lubricant-containing members from deformation, so that the lubricant-containing members are released from undue urging forces, which have the e tendency to forcibly bias the lubricant-containing members against the raceway grooves on the track rail, or make the lubricant-containing members deform to come apart away from the raceway grooves, thereby resulting in keeping the highly accurate sliding contact relation of the lubricant-containing members with the raceway grooves on the track rail as well as helping ensure the reliable lubricant supply to the raceway grooves.

The sintered resinous components for the lubricant-containing members each are of sintered high molecular porous body that is formed by heating powdery ultrahigh molecular weight synthetic resin in a design mould under pressure. The powdery synthetic resin used is selected from polyethylene, polypropylene, tetrafluoroethylene polymer and the like. The powdery ultrahigh molecular weight polyethylene is a material preferable for producing the molded article with high accuracy and further the resultant sintered resinous components are superior in wear proof and in adhesion to metals. In the lubricant-containing members made from the sintered resinous component of ultrahigh molecular weight synthetic resin, no urging force may be necessary for pressing the lubricant-containing members against the raceway grooves.

In case where the adhesives are used to fix the sintered resinous components onto the core metals, the immersion in the lubricant must be made after the sintered resinous components have been adhered to the core metals, because oily surfaces of the lubricant-containing members make much difficult the adhesion of the members to the c or e metals.

The lubricant-containing members fixed to the core metals of high rigidity with mechanical means may be protected from deformation owing to any external forces. Thus, the lubricant-containing members are released from undue urging forces, which have the tendency to forcibly bias the lubricant-containing members against the raceway grooves on the track rail, or make the lubricant-containing members deform to come apart away from the raceway grooves, thereby resulting in keeping the highly accurate sliding contact relation of the lubricant-containing members with the raceway grooves on the track rail as well as helping ensure the reliable lubricant supply to the raceway grooves.

According to another aspect of the present invention, the lubricant-containing members are fixed to the core metals by piercing the members with claws, which are formed by bending parts of the core metals or by implanting pins in the core metals. As an alternative, the lubricant-containing members are fixed to the core metals by grasping partially the members with grasping finger pairs, which are formed by bending parts of the core metals. Simply bending up tapered projections, which have been stamped out from the core metals, may form the claws to pierce the lubricant-containing members or the fingers to grasp the members. The sintered resinous components may be alternatively assembled to the core metal by mechanical means of pins that are implanted in the core metals.

Mechanical fixing of the sintered resinous components on the core metals makes it possible to ignore whether the immersion in the lubricant should be carried out after or before fixing the components on the core metals.

According to another aspect of the present invention, the lubricant-containing members are each fixed to the associated core metal on at least areas neighboring its portions which are brought into sliding contact with the first raceway grooves on the track rail, irrespective of either adhesives or mechanical fixing. With regard to the accuracy in size of the lubricant-containing members, the portions in sliding contact with the raceway grooves on the track rail are very critical. The lubricant-containing members of this invention are each fixed to the associated core metal on at least areas neighboring its portions which are brought into sliding contact with the first raceway grooves on the track rail. Hence the lubricant-containing members may be prevented from the deformation at the portions that are in sliding contact with the raceway grooves, with keeping the highly accurate sliding contact relation with the raceway grooves.

In another aspect of the present invention, dustproof covers are disclosed for shielding the peripheries of the lubricant-containing members. The dustproof covers are provided so as to create no load acting on the lubricant-containing members to deform the members with respect to the track rail. The dustproof covers serve for keeping the lubricant-containing members from the contamination of the dust and dirt, preventing the lubricant-containing members from the breakage as well as the leakage of lubricating oil. The dustproof cover of a single member, when applied on the lubricant-containing members, has tended to cause such undue force as to urge the lubricant-containing member against the raceway grooves on the track rail. To cope with this, it is preferred to use a dustproof cover divided into two halves, each corresponding to each side section of the lubricant-containing member, or another dustproof cover to be fitted loosely over the lubricant-containing member, thereby eliminating the fear of undue force to urge the lubricant-containing member against the raceway grooves.

According to another aspect of the present invention, the end seals, lubricating plate assemblies and end caps are attached together to the casing by bolts. In connection with this arrangement, the lubricant-containing members in the lubricating plate assemblies are each provided with notches in alignment with holes in the associated core metal for the bolts, and collars are snugly fitted in the notches. Moreover, the collars fitted in the notches in the lubricant-containing members each have an axial length corresponding to the thickness of the lubricant-containing member whereby no clamp-down force created by the bolts acts substantially on the lubricant-containing members. In addition, the lubricating plate assemblies are each mounted between the associated end seal and end cap by the bolts in such a manner that the collars are abutted at their opposing ends against the end seal and the core metal. In some cases, the lubricant-containing members may be peeled off from the core metals for replacement by simply taking off the bolts. On mounting the lubricating plate assemblies with the bolts, the clamp-down forces created by the bolts may act on the core metals from the end seals through the collars and in turn be transmitted to the end caps, thus resulting in having little or no effect on the lubricant-containing members. This protects the lubricant-containing members from the deformation that might be otherwise caused owing to the clamp-down force at the portions made in sliding contact with the raceway grooves.

On the linear motion guide unit of the present invention, the core metals fixed to the lubricant-containing members by the adhesives or mechanical means may protect the members from the deformation, thereby maintaining accurately the clearance between the lubricant-containing member and the raceway grooves. The lubricant-containing members may supply smoothly the lubricant to the raceway grooves with no failure of lubrication, thereby helping ensure the good lubrication. The lubricant-containing members, as no urging force comes into action against the confronting raceway grooves, are reduced in sliding resistance to the track rail so that the sliding element may move nimbly on the track rail. The sintered resinous components for the lubricant-containing members may be easily formed with high accuracy of finishing within about ±0.025. This makes it possible to provide the components that are most suitable for the linear motion guideunits incorporated into the precision machines. Since the sintered resinous components are formed with high precision while the lubricant-containing members are free from any urging force against the raceway grooves, the lubricant-containing members may be protected against wear as well as clogging up. The lubricating plate assembly of this invention may be simply mounted to the ends of the sliding element in the conventional linear motion guide unit, which has been incorporated in the machine tool and the like to thereby improve the self-lubricating performance of the linear motion guide unit.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Referring now in detail to the drawings, the linear motion guide unit provided with the lubricating plate assemblies according to the present invention will be explained below. In the accompanying drawings, similar reference characters desige peeled off from the core metals for replacement by simply taking off the bolts. On mounting the lubricating plate assemblies with the bolts, the clamp-down forces created by the bolts may act on the core metals from the end seals through the collars and in turn be transmitted to the end caps, thus resulting in having little or no effect on the lubricant-containing members. This protects the lubricant-containing members from the deformation that might be otherwise caused owing to the clamp-down force at the portions made in sliding contact with the raceway grooves.

On the linear motion guide unit of the present invention, the core metals fixed to the lubricant-through between the confronting raceway grooves so as to permit the sliding movement of the slider relatively of the track rail, and end caps 6 mounted on the lengthwise opposing ends of the casing 5, one to each end opposing lengthwise of the casing or with respect to the sliding direction. The end caps 6 are covered with end seals 17 for closing the lengthwise opposing clearances between the track rail 2 and the slider 1.

The slider 1 may move smoothly with respect to the track rail 1 by virtue of the rolling elements 7 running through loaded raceways that are defined between the raceway grooves in the slider 1 and the raceway grooves 4 the confronting raceway grooves, are reduced in sliding resistance to the track rail so that the sliding element may move nimbly on the track rail. The sintered resinous components for the lubricant-containing members may be easily formed with high accuracy of finishing within about ±0.025. This makes it possible to provide the components that are most suitable for the linear motion guideunits incorporated into the precision machines. Since the sintered resinous components are formed with high precision while the lubricant-containing members are free frit shown in FIG. 20 and, therefore, the previous description regarding the prior art will be applicable.

Lubricating plate assemblies 21 are each arranged on the end caps 6, one to each end cap, for sliding movement with respect to the track rail 2. The end seals 17 are arranged on the ends of the lubricating plate assemblies 21 so as to move on the track rail 2. The lubricating plate assemblies 21 are each secured to the casing 5 in sandwiched relation between the associated end cap 6 and end seal 17. The lubricating plate assemblies 21 are each composed of a lubricant-containing member 22 of porous structure, a core metal 23 on which the lubricant-containing member 22 is fixed, and dustproof cover 24 surrounding around the outer periphery of the lubricant-containing member 22. On incorporating the lubricating plate assembly 21 onto the casing 5, the lubricant-containing member 22 is arranged facing to the associated end seal 17, whereas the core metal 23 is disposed in contact with the associated end cap 6.

Figure 16:
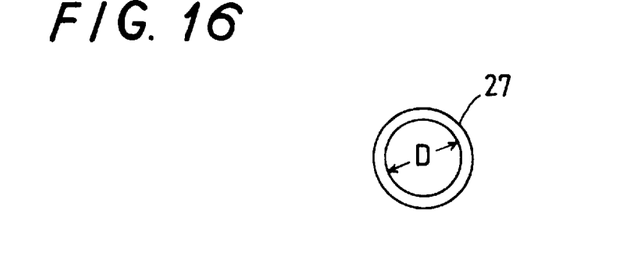
FIG. 16 is a front elevation showing an example of a decorative collar for a lubricating plate assembly.
Figure 17:
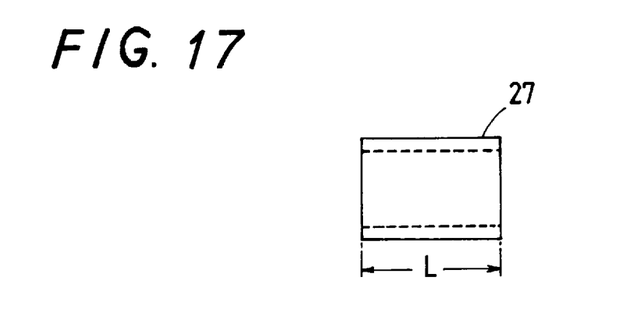
FIG. 17 is a side elevation of the collar in FIG. 16.

Bolts 25 are to fix the end seal 17, lubricating plate assembly 21 and core metal 23 together to the casing 5 through holes 46 at the four corners of the end seal 17, holes 26 formed at the four corners of the core metal 23 in the lubricating plate assembly 21, and holes 15 at the four corners of the end cap 6. Interposed between the end seal 17 and the core metal 23 are collars 27, as shown in FIGS. 16 and 17, in such a manner that they are abutted at their opposing ends against the end seal 17 and the core metal 23 to thereby keep a space, which corresponds in width to the thickness t (refer to FIG. 5) of the lubricant-containing member 22.

Each collar 27 has an inner diameter D and an axial length L corresponding to the thickness t of the lubricant-containing member 22. The bolts 25 are screwed into the matching holes of the casing 5 at the four corners of the lubricating plate assemblies 21 through the collars 27 and the holes 26 in the core metals 23. The clamp-down forces created by the bolts 25 may act on the end seals 17, collars 27, core metals 23 and end caps 6 so as to press them together, but has little or no effect on the lubricant-containing members 22, each of which is then saved at its sliding-contact portions with the raceway grooves 4 from the deformation owing to the clamping force applied by the bolts 25.

Figure 1:
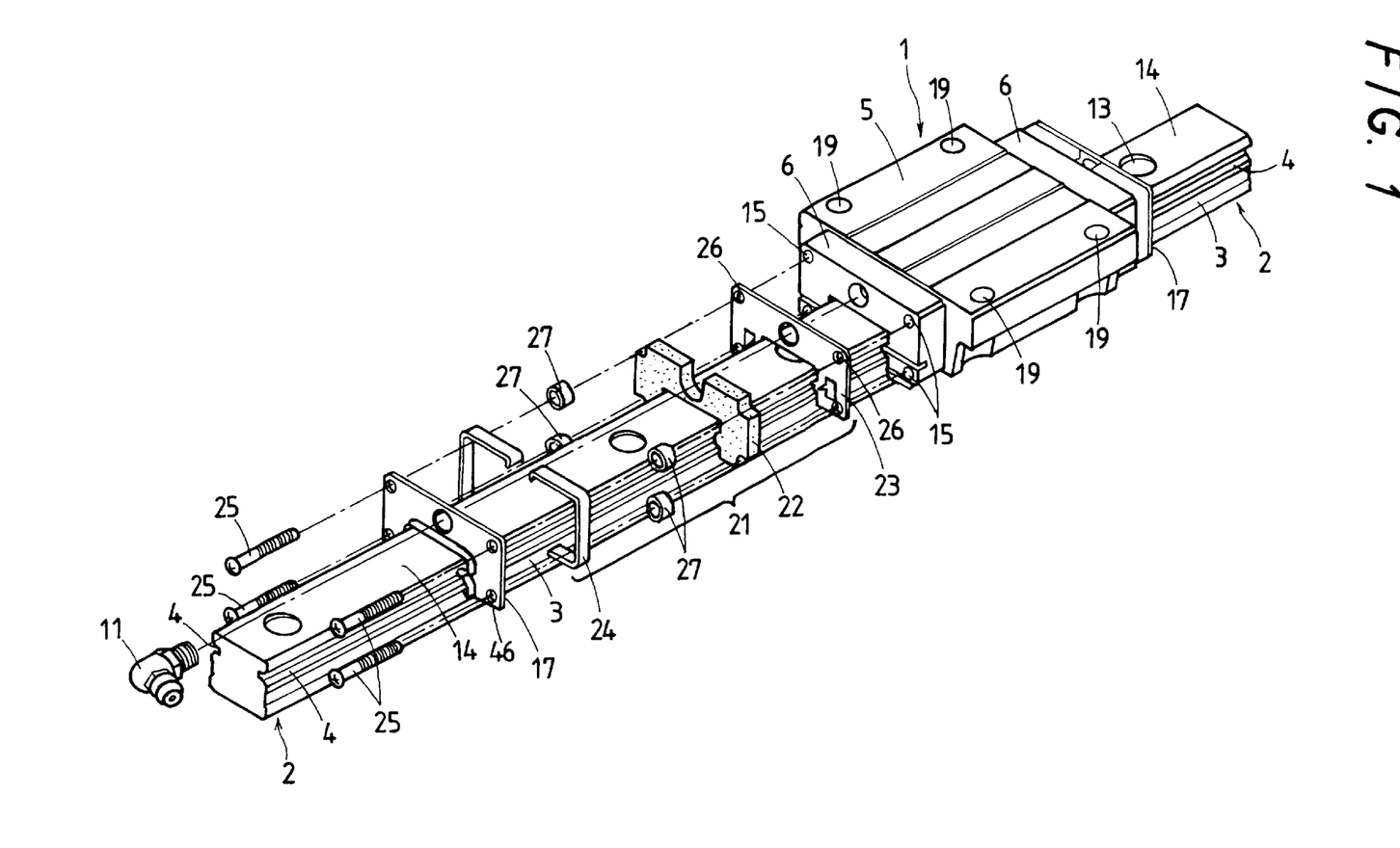
FIG. 1 is an exploded perspective view showing a preferred embodiment of a linear motion guide unit provided with lubricating plates according to the present invention.
Figure 2:
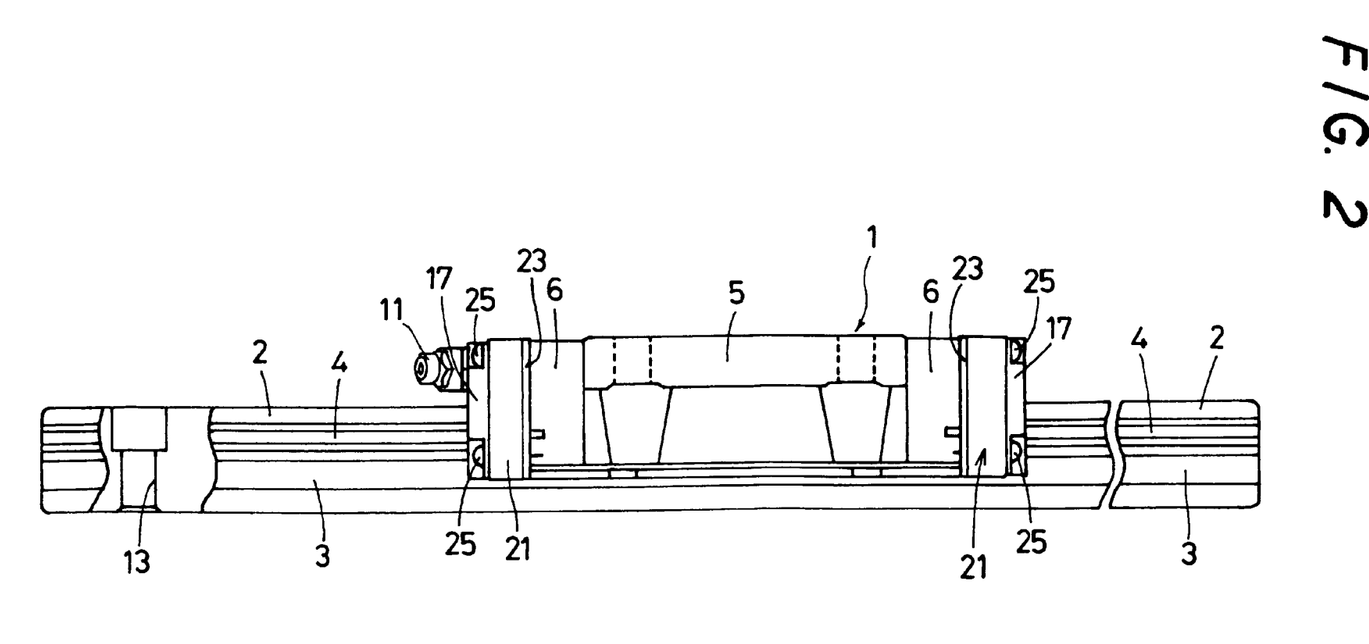
FIG. 2 is a side elevation showing the linear motion guide unit shown in FIG. 1.
Figure 3:
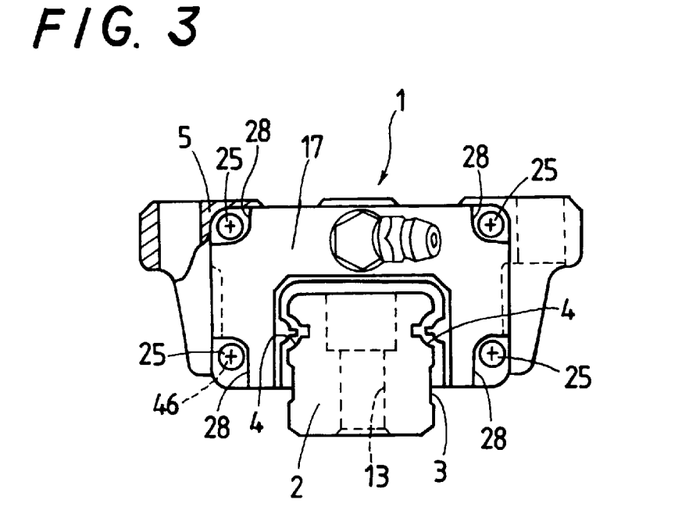
FIG. 3 is a front elevation of the linear motion guide unit shown in FIG. 2.
Figure 4:
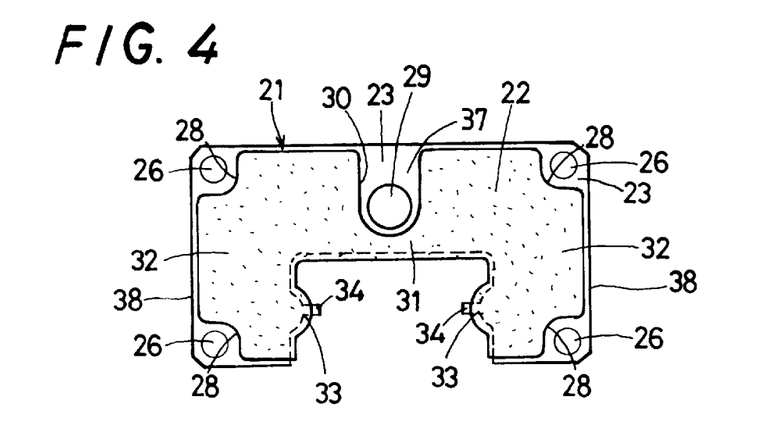
FIG. 4 is a front elevation showing a lubricating plate assembly to be incorporated in the linear motion guide unit shown in FIG. 1.
Figure 5:
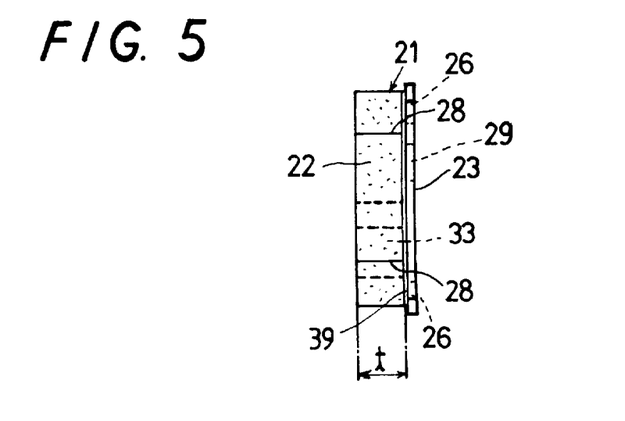
FIG. 5 is a side elevation of the lubricating plate assembly shown in FIG. 4.

As shown in FIGS. 4 and 5, the lubricant-containing members 22 are notched at 28 in alignment with the holes 26 in the core metals 23. Arranged in the notches 28 are the collars 27 through which are inserted the bolts 35. The core metals 23 are each provided at a bridge section 37 thereof with an opening 29 for unobstructively fitting therein the grease nipple 11. The bridge sections 31 of the lubricant-containing members 22 are recessed at 30 around the openings 29 for the grease nipples. The lubricant-containing members 22 each include side sections 32 spaced widthwise the track rail, the side sections 32 being each formed on the inside thereof with a convex portion 33, which extends towards the associated raceway groove 4 of the track rail 2 so as to make a sliding contact with the raceway groove 4 thereby supplying constantly lubricant or lubricating oil, contained in sintered resinous members, to the raceway grooves 4 from the convex portions 33. Side sections 38 of the core metal 23 are also provided at their inside with protrusions 34 extending towards the bottom of the associated raceway groove 4 of the track rail 2 in correspondence with the associated convex portion 32 of the lubricant-containing member 22.

Figure 18:
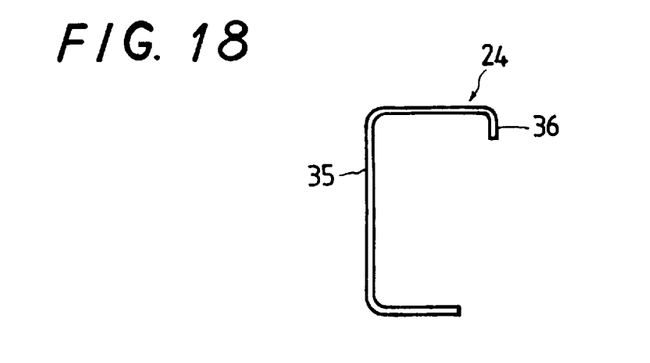
FIG. 18 is a front elevation showing an example of a dustproof cover for the lubricating plate assembly.
Figure 19:
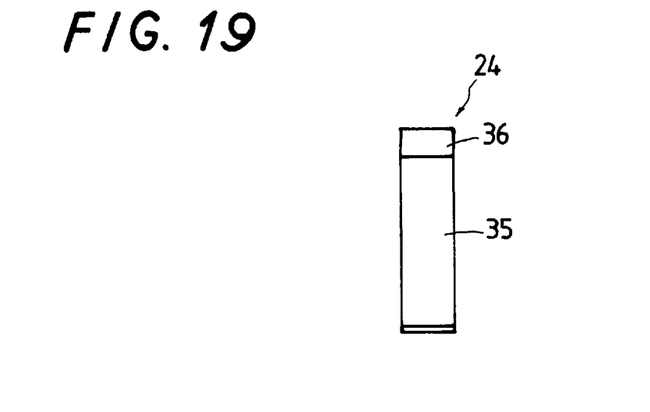
FIG. 19 a side elevation showing the dustproof cover of FIG. 18.

FIGS. 18 and 19 show the dustproof cover 24 surrounding the periphery of the lubricant-containing member 22. The dustproof cover 24 is made of thin metallic band such as elastic metal strip and divided into right-side and left-side halves along a plane including the raceway grooves 4 of the track rail 2. Each dustproof cover half 24 is composed of a embracing major section consisting of an upper side, lateral side and bottom side interconnected together so as to cover respectively the top surface, side surface and bottom surface of the associated side section 32 of the lubricant-containing member 22, and a claw 36 formed by bending the free end of the upper side of the embracing major section 35 so as to make engagement with the recess 30 of the lubricant-containing member 22. Each dustproof cover 24 serves for keeping the associated lubricant-containing member 22 from the contamination of the dust and dirt, preventing the lubricant-containing member 22 from the breakage as well as the leakage of lubricating oil. Splitting the dustproof cover 24 into two halves is effective to release the lubricant-containing member 22 from undue urging forces, which might otherwise bias the lubricant-containing member 22 against the raceway grooves 4 on the track rail 2 as well as make the lubricant-containing member 22 deform to come apart away from the raceway grooves. As long as no excessive force is applied against the side sections 32, 32 of the lubricant-containing member 22, the dustproof cover 24 may be alternatively formed from a single metal band surrounding loosely the entire of the upper and widthwise opposing lateral sides of the lubricant-containing member 22.

Sintered resinous component for the lubricant-containing member 22 is produced from powdery synthetic resin that is sintered in a mould by heating under high pressure to be converted to a porous structure, which is adapted to be immersed with lubricating oil. The sintered resinous component of powdery ultrahigh molecular weight polyethylene resin may be formed with high accuracy, for example, accuracy of finishing within about ±0.025. The powdery ultrahigh molecular weight polyethylene resin has such preferable property that it is susceptible to the conjunction with metal on sintering. The grading of powdery ultrahigh molecular weight polyethylene resin is, for example, 30 $\mu$m in fine grain size, and from 250 $\mu$m to 300 $\mu$m in coarse grain size, while the porous structure in the sintered resinous component includes therein continuous voids of the porosity of, for example, from 40% to 50%.

Dipping the sintered resinous component into, for example, turbine oil for about 30 minutes carries out the immersion of the porous structure with the lubricating oil. Percentage of lubricating oil content may be controlled in accordance with the operating condition of the slider 1. For example, the lubricant-containing member may be regulated at percentage of lubricating oil content of 41% by weight and thus at oil content of about 2 cc.

As the lubricant-containing member 22 for the lubricating plate assembly 21 has the advantage of being finished with high accuracy, this lubricant-containing member 22 may be produced so as to be fitted to any raceway groove 4 on the track rail 2 with little or no clearance (substantially no clearance) or only a clearance for interference under somewhat pre-stressing. The lubricant-containing member 22 is kept in substantially continuous sliding contact with the raceway grooves 4 on the track rail 2 whereby the lubricant contained in the lubricant-containing member 22 may be supplied incessantly onto the raceway grooves 4. This makes it possible to achieve the maintenance-free operation of the linear motion guide unit. The resinous component molded by sintering the powdery ultrahigh molecular weight polyethylene resin has the advantage of causing no clogging up of the lubricant-containing member 22 owing to wear-dust, because the resinous component has the property of resisting against the extreme abrasion even under repeated sliding motions. Whenever the lubricant in the porous member 22 has consumed, the porous member 22 may be replenished with new lubricant so that the lubricating plate assembly 21 may be used for long service life.

The lubricant-containing member 22 is secured to the core metal 23 with adhesive. The lubricant-containing member 22 of the powdery ultrahigh molecular weight polyethylene resin may be easily adhered to the core metal 23 by using the adhesive 39 of epoxy resin. Moreover, the sintered resinous component is preferably immersed with the lubricant, after having been fixed to the core metal 23 with the adhesive 39. In the embodiment shown, although the lubricant-containing member 22 is adhered over its entire surface to the core metal 23 with the adhesive 39, local adhesion neighboring the convex portions may be sufficient. On this design of local adhesion in which the lubricant-containing member 22 is adhered to the rigid core metal 23 at only the area neighboring the convex portions 33 making a sliding contact with the raceway grooves 4, even if the lubricant-containing member 22 is subject to the external force great to cause its deformation, the core metal 23 resists the deformation of the convex portions 33 to keep the accuracy of their sliding surfaces with respect to the raceway grooves 4. As a result, the convex portions 33 of the lubricant-containing member 22 are kept from not only excessive pressing against the raceway grooves 4, but also separation away from the raceway grooves 4, thereby capable of incessantly supplying the sufficient lubricant to the raceway grooves 4 with no increase of the sliding resistance to the raceway grooves 4.

Figure 6:
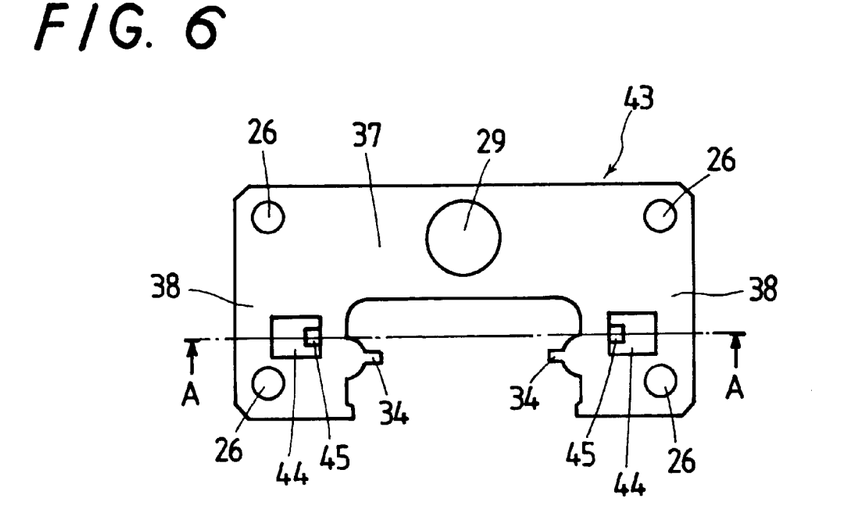
FIG. 6 is a side elevation of another embodiment of a core metal for the lubricating plate assembly according to the present invention to be incorporated in linear motion guide unit.
Figure 7:
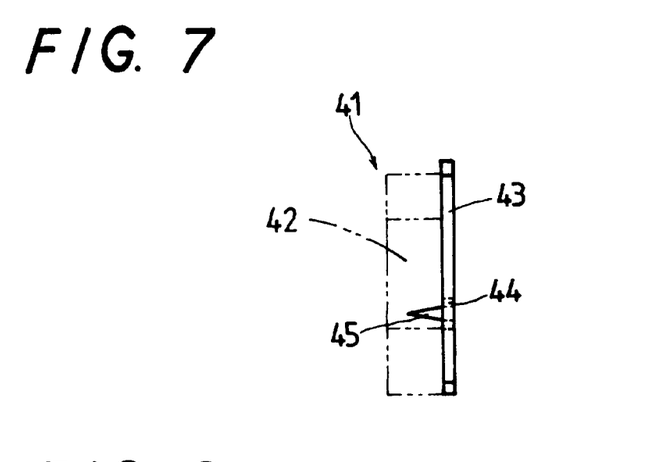
FIG. 7 is a side elevation of the core metal shown in FIG. 6.
Figure 8:
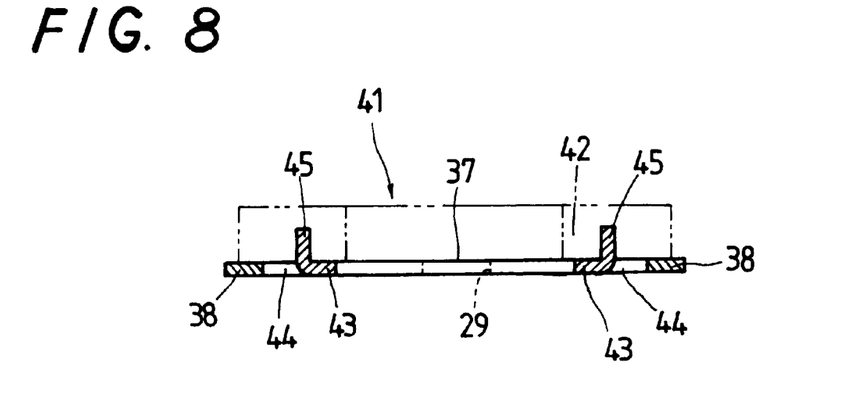
FIG. 8 is a section view of the core metal and being taken along the line A—A of FIG. 6.

In the next place, a second embodiment of the lubricating plate assembly adapted to the linear motion guide unit with reference to FIGS. 6 to 8. In a core metal 43, similar reference characters designate similar elements or components with that of the core metal 23 shown in FIG. 5, and the previous description will be applicable.

As illustrated in FIGS. 7 and 8 with phantom lines, a lubricating plate assembly 41 is comprised of a lubricant-containing member 42 and the core metal 43. Windows 44 are formed in side sections 38 of the core metal 43 at the center thereof by stamping, where projections stamped out are raised up to the side, on which a lubricant-containing member 42 is to be attached, and sharpened in the form of a spear or arrowhead, thereby providing piercing projections 45. The sintered resinous component may be assembled to the core metal 43 by simply piercing it with the piercing projections 45. By immersing the sintered resinous component, either before or after piercing it with projections 45, the lubricating plate assembly 41 may be easily produced, in which the lubricant-containing member 42 is fixed to the core metal 43. All the precision on working, clearance with respect to the raceway grooves 4 and anti-clogging property, described above in connection with the embodiment shown in FIGS. 1 to 5, are equally applicable to the lubricant-containing member 41 of powdery ultrahigh molecular weight polyethylene resin.

Figure 9:
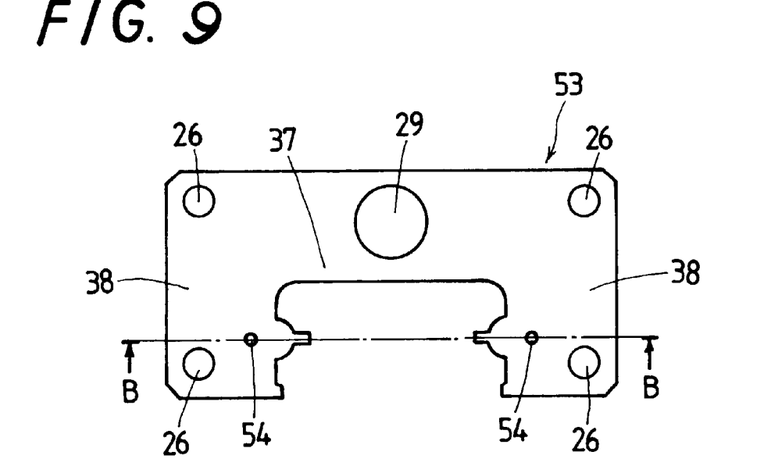
FIG. 9 is a side elevation of a further another embodiment of a core metal for the lubricating plate assembly according to the present invention to be incorporated in linear motion guide unit.
Figure 10:
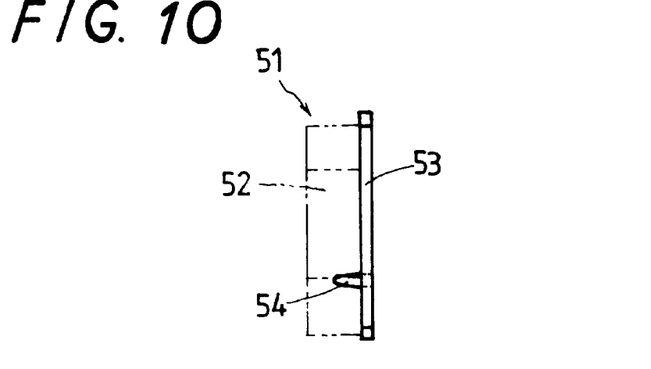
FIG. 10 is a side elevation of the core metal shown in FIG. 9.
Figure 11:
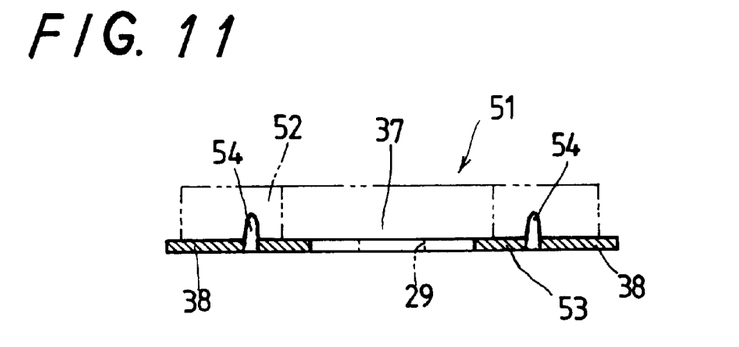
FIG. 11 is a section view of the core metal and being taken along the line B—B of FIG. 9.
Figure 12:
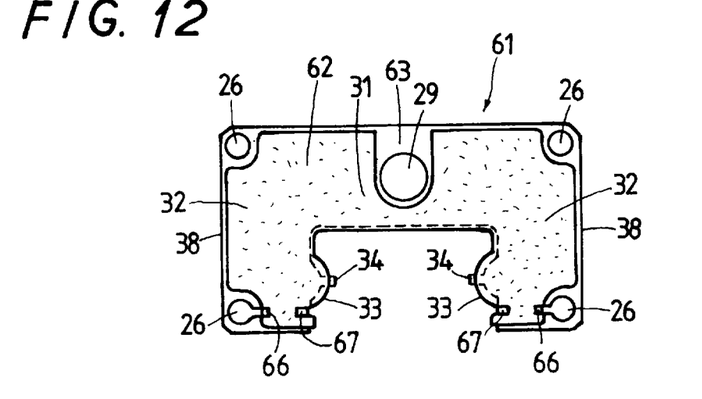
FIG. 12 is a front elevation of another embodiment of the lubricating plate assembly according to the present invention to be incorporated in linear motion guide unit.
Figure 13:
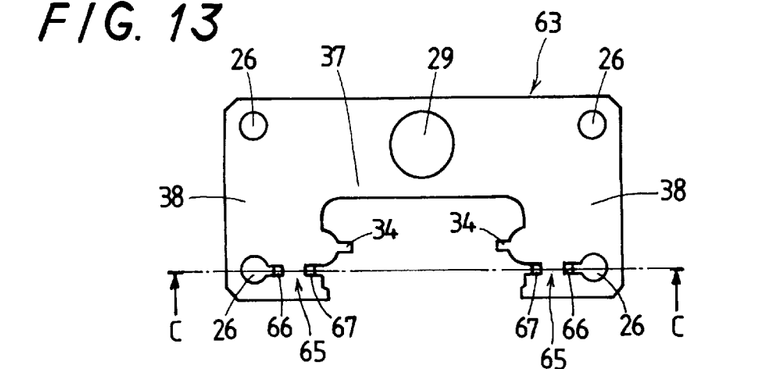
FIG. 13 is a front elevation showing a core metal employed in the lubricating plate assembly of FIG. 12.
Figure 14:
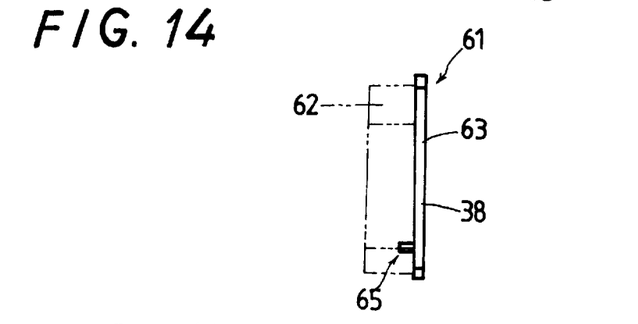
FIG. 14 is a side elevation of the core metal shown in FIG. 13.
Figure 15:
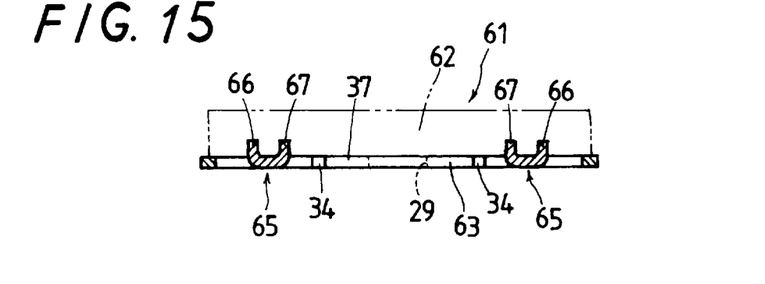
FIG. 15 is a section view of the core metal and being taken along the line C—C of FIG. 9.

FIGS. 9 to 11 show a third embodiment of the lubricating plate assembly adapted to the linear motion guide unit. A core metal 53 in FIGS. 9 to 11 is substantially similar in structure and function with the embodiment shown in FIGS. 6 to 8, except for the structure for fixing it to a lubricant-containing member 52 and, therefore, like parts or components have been given the same reference characters, so that the previous description will be applicable. The core metal 53 in FIGS. 9 to 11 has pointed pins 54 that are implanted in the core metal 53 to thereby fixing the lubricant-containing member thereon. A sintered resinous component for the lubricant-containing member 52, illustrated with phantom lines, is secured to the core metal 53 by piercing it with the pins 54 and, then, immersed with lubricant, thereby obtaining the lubricating plate assembly 51. As an alternative, the sintered resinous component is first immersed with lubricant to obtain the lubricant-containing member 52, which is in turn secured to the core metal 53 by piercing it with the pins 54, resulting in the lubricating plate assembly 51.

A fourth embodiment of the lubricating plate assembly for the linear motion guide unit will be explained below with reference to FIGS. 12 to 15. A lubricating plate assembly 61 is substantially similar in structure and function with the embodiment shown in FIGS. 6 to 8, except for the structure for fixing a core metal 63 to a lubricant-containing member 62 and, therefore, like parts or components have been given the same reference characters, so that the previous description will be applicable.

In accordance with the embodiment shown in FIGS. 12 to 15, grasping finger pairs 65 are formed in the side sections 38 of the core metal 63 at the lower areas thereof. The grasping finger pairs 65 are each composed of a pair of confronting fingers 66, 67, which have for their object to hold the lubricant-containing member 62 at a location neighboring the associated convex portion 33 of the lubricant-containing member 62. The confronting fingers 66, 67 are raised up to the side, on which the lubricant-containing member 62 is to be secured, by bending a part of the peripheral edges of the holes 26 for bolts and a part of the inside edges of the side sections 38. The lubricant-containing member 62 is held in position on the core metal 63 by the grasping action of the confronting fingers 66, 67. The grasping finger pairs 65 allow either before or after mounting to the core metal 63 the immersion of sintered resinous component for the lubricant-containing member 62 in lubricant.

The lubricant-containing members 22, 42, 52, 62 described above may be designed such that, for example, the convex portions 33 brought into sliding contact with raceway grooves 4 of the track rail 2 are made rich in porosity, whereas the residual portions are made less in porosity. The portions rich in porosity are highly susceptible of absorbing lubricating oil to admit the positive flow of lubricating oil into the highly porous portions themselves. The lubricant-containing member having two parts different in porosity from each other may be fabricated, for example, by using any kind of powdery resinous materials differing in grain size, or by regulating the sintering temperature. Such lubricant-containing member may be also produced by making separately the two parts different in porosity from each other and then combining together them with covering means or the like as will be described below. As an alternative, the lubricant-containing member is partially coated with a solid skin to prevent the lubricating oil from leakage, with the exception of the convex portions 33 and the upper surfaces through which the lubricating oil may soak into the lubricant-containing member. The skin coating the lubricant-containing member may be formed by raising the temperature during sintering at the desired surface area of the sintered resinous component to thereby block the voids at the surface area, or by coating a resinous material over the desired surface area. Moreover, a lubricating oil reservoir, either open or closed with a lid, may be arranged so as to communicate with the upper surface of the lubricant-containing member in order to prolong the service life with no replenishment of the lubricating oil. In addition, the lubricating plate assembly may be designed as being divided into two halves in opposite sides of the track rail 2. In this design, the lubricating plate assembly alone is mountable to and demountable from the track rail 2, with leaving the casing 5 on the track rail 2. The lubricant may be selected in matching with the sintered resinous component of porous structure and simply contained in the voids of the sintered resinous component. On the other hand, the lubricant-containing member has only to be made of the resinous material that is selected in accordance with the lubricating oil employed. Consequently, changes on specification may be admitted easily.

While the present invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A linear motion guide unit comprising a track rail provided at lengthwise side surfaces thereof with first raceway grooves, a slider movable on the track rail, wherein the slider has a casing provided with second raceway grooves in opposition to the first raceway grooves, rolling elements movable along raceways defined between the confronting first and second raceway grooves, end caps secured to the opposing end surfaces of the casing, lubricating plate assemblies secured on the end caps, and end seals arranged on the ends of the lubricating plate assemblies, and further wherein the lubricating plate assemblies each have a core metal and a lubricant-containing member fixed on the core metal with any one of adhesive and mechanical means, the lubricant-containing member being made of a sintered resinous component having porous structure, and lubricant being impregnated into the porous structure of the sintered resinous component.

2. A linear motion guide unit as claimed in claim 1, wherein the lubricant-containing members are each fixed to the associated core metal on at least areas neighboring its portions which are brought into sliding contact with the first raceway grooves on the track rail.

3. A linear motion guide unit as claimed in claim 1, wherein the sintered resinous components for the lubricant-containing members are formed by molding powdery ultra-high molecular weight synthetic resin with heating under pressure.

4. A linear motion guide unit as claimed in claim 1, wherein dustproof covers are provided for shielding the peripheries of the lubricant-containing members with no load which acts on the lubricant-containing members to deform the members with respect to the track rail.

5. A linear motion guide unit as claimed in claim 1, wherein the end seals, lubricating plate assemblies and end caps are attached together to the casing by bolts.

6. A linear motion guide unit as claimed in claim 5, wherein the lubricant-containing members in the lubricating plate assemblies are each provided with notches in alignment with holes in the associated core metal for the bolts, and collars are snugly fitted in the notches.

7. A linear motion guide unit as claimed in claim 6, wherein the collars fitted in the notches in the lubricant-containing members each have an axial length corresponding to the thickness of the lubricant-containing member whereby no clamp-down force created by the bolts acts substantially on the lubricant-containing members.

8. A linear motion guide unit as claimed in claim 1, wherein the slider saddles the track rail for sliding movement relatively of the track rail.

9. A linear motion guide unit as claimed in claim 1, wherein the sintered resinous components for the lubricant-containing members are immersed with the lubricant at any one event of before and after attaching the components to the core metals by mechanical fixing means.

10. A linear motion guide unit as claimed in claim 1, wherein the sintered resinous components for the lubricant-containing members are immersed with the lubricant after attaching the components to the core metals by adhesive.

11. A linear motion guide unit as claimed in claim 1, wherein the sintered resinous component for the lubricant-containing member comprises a powdery synthetic resin that is sintered in a mould by heating under high pressure to be converted to a porous structure, which is capable of receiving lubricating oil in the porous structure.

* * * * *